United States Patent Office.

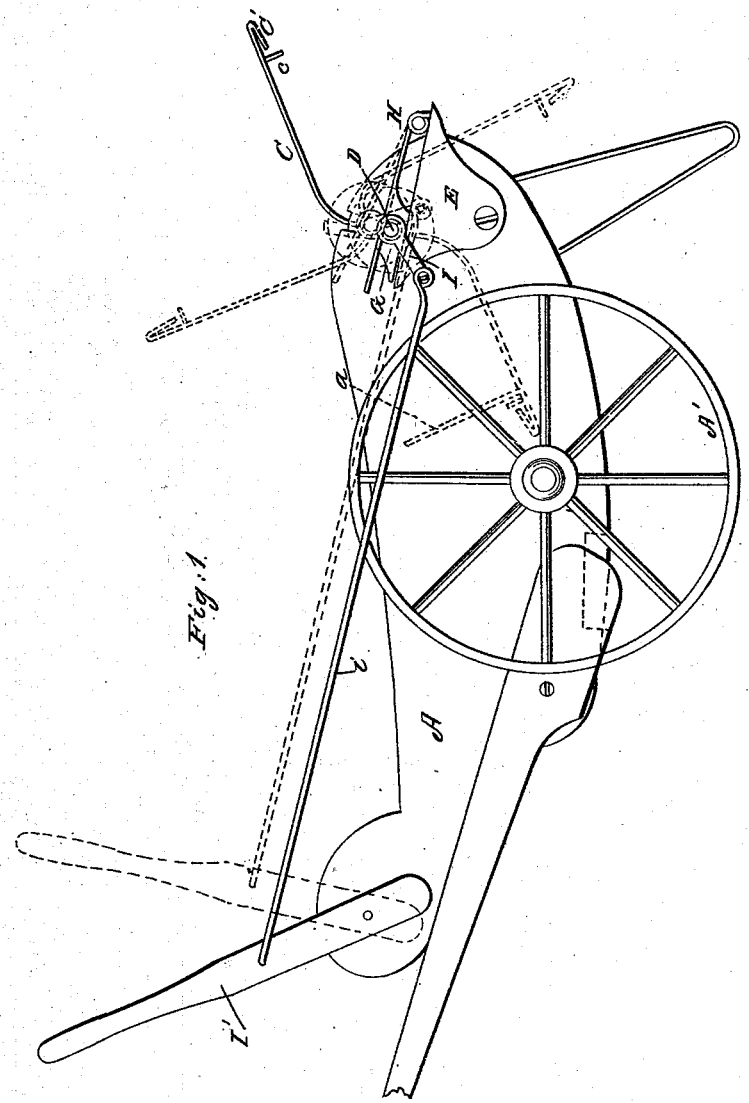

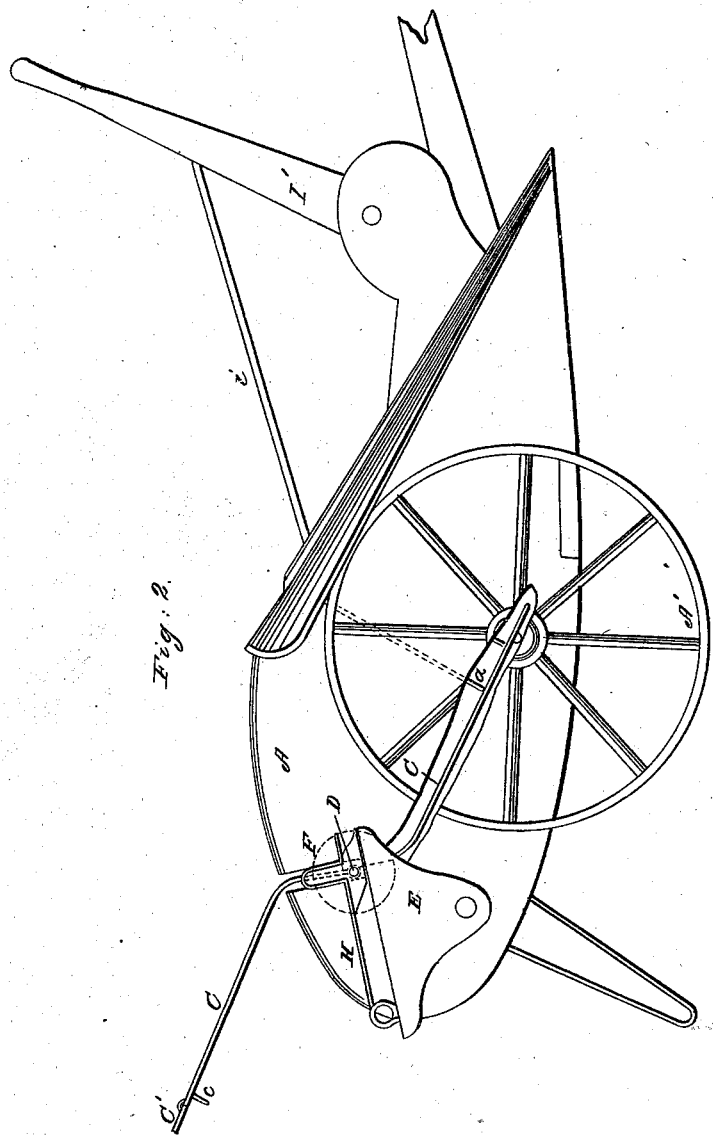

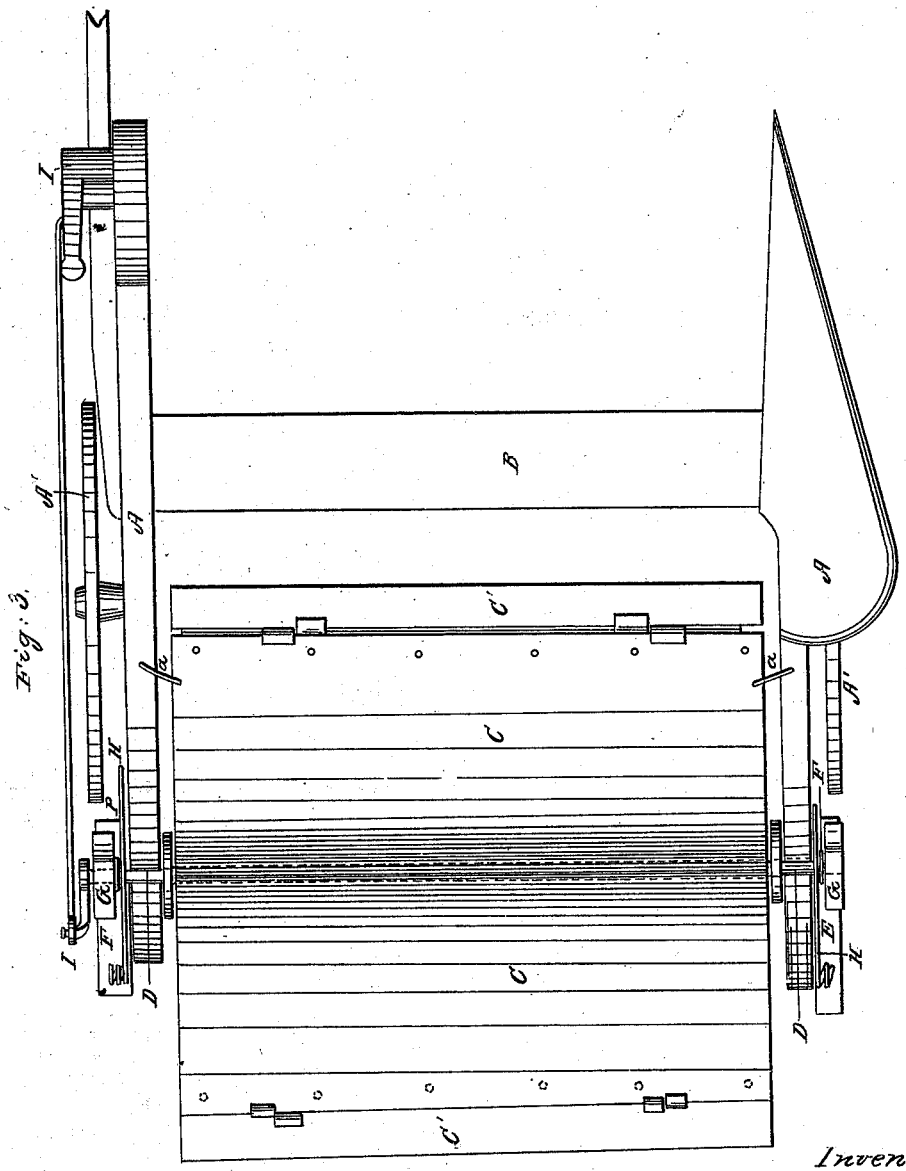

ROBERT CONARROE, OF CAMDEN, OHIO, ASSIGNOR TO HIMSELF, HOWARD YOUNG, AND ABRAHAM C. STAUFFER, OF SAME PLACE.

Letters Patent No. 97,884, dated December 14, 1869.

IMPROVEMENT IN HARVESTERS.

The Schedule referred to in these Letters Patent and making part of the same.

*To all whom it may concern:*

Be it known that I, ROBERT CONARROE, of Camden, in the county of Preble, and State of Ohio, have invented a new and useful Improved Sheaf-Dropper; and I do hereby declare that the following is a full, clear, and exact description thereof, reference being had to the annexed drawings, and to the letters of reference marked thereon.

Figure 1 is a side elevation of that portion of a reaper or harvesting-machine which carries the cutter-bar, showing my improved sheaf-dropper, and mechanism for operating the same attached thereto.

Figure 2 is a similar view from the other side.

Figure 3 is a plan view thereof.

The same letters indicate like parts in the several figures.

This invention relates to harvesting-machines; and

It consists in providing such machines with a rotating dropper, or platform having two wings, which are made of sheet-metal or other suitable material, and curved at a short distance from the point where they join the axis upon which they rotate, so as to cause their lower portions, when in a position to receive the grain, to assume a horizontal, or nearly horizontal position, while their other portions are nearly vertical, as will be more fully described hereinafter.

To enable those skilled in the art to make and use my invention, I will proceed to describe its construction and operation.

A A, in the drawings, represent the guides or frame of that portion of a reaper to which the cutter-bar is attached. In this instance I have shown it as extending some distance to the rear, so as to form bearings for the journals of the shaft carrying the sheaf-dropper and supports to the operating parts.

The frame is mounted upon two wheels, A' A'. To its inner sides are fastened the springs $a$ $a$, which assist in holding the sheaf-dropper in position, and also in guiding the cut grain on the respective apron.

B represents the cutter-bar.

C C represent the sheaf-dropper, which may be made of sheet-metal, or other suitable material combining strength and lightness. It is to be made of the form, or a form similar to that clearly shown in figs. 1 and 2, which is such that the apron, in position to receive the grain, extends a short distance downward from the shaft to which the central portion of the dropper is firmly secured, and is then curved forward, while the other apron extends upward a like distance, and is there curved backward. Owing to the peculiar construction of that portion of the device upon which the grain falls as it is cut, the delivery of such grain is very much facilitated, as the flat surface is by it sooner brought into a vertical position. The dropper is to be of about a width equal to the distance between the sides of the frame, to which it is attached in such a manner as to be able to receive the longest grain on its aprons, which must have the necessary length. To make the dropper as light as possible, and insure a more easy operation of the same in cutting ordinary-length grain, I construct the aprons with hinged portions, C', which are to be used only when cutting short grain, and are to be folded up or removed at other times. The upper side of the front end of the two aprons is provided with a series of pins or fingers $c$ $c$, which serve to hold the cut grain in proper position on the aprons when the machine is in an inclined position, as in working on sideling ground.

D represents a horizontal transverse shaft, to which the dropper is firmly secured. The drawings represent its journals extending through slots in the sides of the frame, and having their bearings therein, as well as in slotted standards secured to supports E. It is apparent that this construction of the parts is not necessary to a proper working of the dropper, and that the shaft may have its bearings in the slotted standards only.

E E represent two blocks or supports which are to be firmly secured to the frame A, with their upper plain surfaces, on which the cams G, soon to be described, work, somewhat inclining to the rear. These supports may be of the form clearly shown in figs. 1 and 2, or of any form which is adapted to the purpose. They are attached to the frame at a suitable distance in rear of the cutter-bar, and their upper surfaces are to be at such an elevation that the cams shall, in rotating, raise the dropper sufficiently to clear its aprons.

F F represent standards, which are secured to the supports, and are provided with slots in which the journals of the shaft D work.

G G represent two cams, which are firmly secured on elongations of the journals of the shaft of the dropper. These cams are to perform two functions, namely, in rotating the dropper, they are to raise it sufficiently to keep its aprons clear of the ground, and to form stops alternately for each apron as it is brought into position to receive the grain. To this end they are formed with two parallel sides, which lie alternately on the upper surface of the supports E, and serve as levers to hold the shaft and dropper in position. By reference to fig. 1 it will be seen that in rotating the shaft in the direction indicated by the arrow, one end of the cams sliding over the supports, raises the shaft in the slotted standards until a quarter revolution is performed, when they again assume such a position with reference to the supports as to allow the shaft and dropper to fall, the apron being by this time in an inclined position and free of the ground.

The ends of the cams are to be so formed, that in completing the movement they offer the least possible resistance.

H H represent two springs, one of which is secured to each support, its loose end lying on the upper surface of the shaft. Their office is to assist the cams in holding the dropper in proper position, and to insure its return to its lowest position after it has been raised by the cams.

I is a crank fastened on the extreme end of the inner journal of the shaft, connected by a connecting-rod, i, to the hand-lever I', which turns over a stud secured to the frame. This lever is to be in convenient reach of the operator, who by reciprocating it, as indicated by red outlines in fig. 1, imparts a rotary motion to the shaft D and dropper C, in the direction of the arrow, or so that, as one apron is drawn from under the grain, and allows it to fall to the ground, the other is brought into position to receive it. These parts, i. e., connecting-rod and lever, may be so constructed and located as to be operated by the feet of the driver, if this is preferred.

The operation is as follows:

The grain being cut in the ordinary manner by the cutter-bar, falls over on one of the aprons of the dropper until enough has been cut and deposited to form a sheaf, when the grain is dropped by rotating the dropper, which draws the apron carrying the grain from under it, allowing it to fall to the ground. The ends of the grain lying on the rear portion of the cutter-bar being lighter than the ear-ends, will slide off as the machine moves along. By the same movement the other apron is brought into position to receive the grain, and its peculiar construction enables it in its movement to remain under the falling grain. Thus the operation is continued.

Having thus described my invention,

What I claim, and desire to secure by Letters Patent, is—

A sheet-metal sheaf-dropper, constructed substantially as shown, and for the purpose specified.

In testimony whereof, I have signed my name to this specification, in the presence of two subscribing witnesses.

ROBERT CONARROE.

Witnesses:
D. P. HOLLOWAY,
F. H. SPRAGUE.